United States Patent Office

3,445,252
Patented May 20, 1969

3,445,252
ALPHA- AND BETA-CRISTOBALITE GLASS-CERAMIC ARTICLES AND METHODS
John F. MacDowell, Painted Post, N.Y., assignor to Corning Glass Works, Corning, N.Y., a corporation of New York
No Drawing. Filed Sept. 14, 1966, Ser. No. 579,204
Int. Cl. C04b 35/14; C03c 3/22
U.S. Cl. 106—39        12 Claims This invention relates to glass-ceramic articles and, in particular, to glass-ceramic articles wherein the principal crystalline phase is an analogue of a cristobalite polymorph of silica.

The production of glass-ceramic or semicrystalline ceramics, as they have frequently been termed, is a relatively new development in the field of ceramic technology, the basic patent relating thereto being No. 2,920,971. Glass-ceramics are formed as the result of the controlled crystallization of glass articles through heat treatment thereof. In brief, the method of manufacture comprises compounding a glass-forming batch to which a nucleating or crystallization-promoting agent is generally added. The batch is then melted and this melt simultaneously cooled and shaped into a glass article of a predetermined configuration. Thereafter, the glass article is subjected to a carefully monitored heat treating schedule such that nuclei are first produced that provides sites upon which crystals are subsequently grown as the heat treatment continues. Since the original body is a glass and the crystals are grown in situ, the final glass-ceramic body is free of voids and non-porous. The crystals are relatively uniformly fine-grained and homogeneously, but randomly dispersed in a glassy matrix. The amount of crystallization developed is generally over 50 percent and, in many instances, over 90 weight percent. Therefore, since the crystallinity of these products is so high, the chemical and physical properties thereof reflect, in the main, the characteristics of the crystal rather than of the original glass. The crystal phases developed depend upon the composition of the initial glass and the heat treatment applied thereto. The temperature to which the glass article is subjected during heat treatment is frequently determinative of the identity of the crystals produced. Hence, it often occurs that one crystal phase will be grown at one temperature of heat treatment and another phase will be produced at a different temperature.

Electron microscopic studies of glasses in the binary system $Al_2O_3$—$SiO_2$ have demonstrated that metastable liquid immiscibility is widespread therein. A dispersion of amorphous droplets of a high alumina phase appears to occur within a high silica continuous glassy matrix during the cooling of binary melts containing about 5–20 mole percent $Al_2O_3$ to glass bodies utilizing conventional glass-forming methods. Melts containing higher alumina contents also undergo emulsion formation but the dispersed glassy droplets become larger and are prone to crystallize spontaneously as the melt is being shaped and cooled to a glass article. This spontaneous devitrification is generally composed of mullite ($3Al_2O_3 \cdot 2SiO_2$).

Glass-ceramic bodies normally have a much higher intrinsic mechanical strength than the glass from which they are derived. Also these bodies can be further strengthened by the application of a glass thereon having a lower coefficient of expansion than the glass-ceramic itself. Finally, where alkali metal ions are present in the composition, the glass-ceramic body can be strengthened through a chemical ion exchange treatment such as is discussed in the copending application, Ser. No. 365,117, filed May 5, 1964.

The production of glass-ceramics from glasses in the binary system $Al_2O_3$—$SiO_2$ is described in my Patent No. 3,236,662. As is explained in that patent, heat treatment of glasses in this binary system where there is a substantial amount of $Al_2O_3$ present normally results in crystals of mullite and a beta-cristobalite-type crystal being formed. Beta-cristobalite is the high temperature dimorph of cristobalite which has a low coefficient of thermal expansion. This crystal phase is quite stable in these materials to temperatures over 1300° C. However, as the body is cooled to below about 200° C., much of the beta-cristobalite inverts to the alpha-form. Alpha-cristobalite has a much higher coefficient of thermal expansion such that this inversion is accompanied by a large volume decrease which frequently results in the cracking and actual breakup of the crystallized product.

There are three approaches for eliminating this undesirable inversion:

(1) To stabilize the beta-cristobalite structure;
(2) To stabilize the alpha-cristobalite structure; or
(3) To eliminate or substantially inhibit the growth of cristobalite-type crystals.

My Patent No. 3,236,662 adopted the third approach to the problem. Thus, minor amounts of $Na_2O$, $K_2O$, $Rb_2O$, $Cs_2O$, CaO, SrO, BaO, $La_2O_3$, and/or $P_2O_5$ were added to inhibit the formation of cristobalite such that the crystallization formed was essentially all mullite. Such mullite-type glass-ceramics have coefficients of thermal expansion less than $100 \times 10^{-7}/°$ C. between 0°–300° C. and generally range from $30–50 \times 10^{-7}/°$ C.

I have discovered that the addition of at least 0.5%, but no more than about 3% by weight, of $Li_2O$ will effectively promote the growth of alpha-cristobalite-type crystals upon the heat treatment of $Al_2O_3$—$SiO_2$ glasses consisting essentially, by weight on the oxide basis, of about 5–40% $Al_2O_3$ and 55–90% $SiO_2$, the sum of the $Al_2O_3$ and $SiO_2$ constituting at least 90% by weight of the glass, and will stabilize these crystals to temperatures up to about 1200° C. The coefficients of thermal expansion of these glass-ceramics range about $150–250 \times 10^{-7}/°$ C. between 0°–300° C. The exact mechanism by which the stabilization of the alpha-cristobalite polymorph of silica is accomplished is not known with complete certainty, but it is believed that there is a substitution during crystallization of $Al^{+3}$ ions for $Si^{+4}$ ions accompanied by $Li^+$ ions which satisfy the electrical charge and structural requirements. They are, in essence, stuffed derivatives of, or analogues to, the pure $SiO_2$ cristobalite structures. (Buerger, M.J., The Stuffed Derivatives of the Silica Structures, Am. Mineral., 39, 600–14 (1954).) These glass-ceramics can be made substantially completely transparent and the coefficients of thermal expansion are high enough to render the products suitable for sealing to certain high expansion metals such as iron, steel, and certain stainless steels. This factor permits these products to be considered as protective coatings for metals.

I have further discovered that the addition of at least 1% but not more than about 5% by weight total of CaO, CuO, or SrO to the above-described glasses causes the growth of a beta-cristobalite derivative as the principal crystal phase upon heat treatment thereof and stabilizes these crystals up to about 1500° C. The glass-ceramic bodies containing beta-cristobalite derivative as the principal crystal phase have coefficients of thermal expansion generally ranging from about 60 to $90 \times 10^{-7}/°$ C. between 0–300° C. Since these bodies are highly crystalline, generally over 50% by weight and in most instances over 75% by weight, and the residual glassy matrix is very high in silica content, deformation under load is small even at 1500° C. In other words, the softening points of these products are not exceeded until near the solidus temperatures, i.e., around 1500° C. These bodies do not exhibit complete transparency but are, rather, translucent or opaque. This property of translucency, when combined with the high thermal stability of the product, has recommended the use of this material as envelopes for high temperature lighting fixtures. The stabilization of beta-cristobalite is believed to be the result of further substitution of $Al^{+3}$ ions for $Si^{+4}$ ions with the introduction of $Ca^{+2}$, $Cu^{+2}$, and/or $Sr^{+2}$ ions into the lattice. $Li_2O$ in an amount up to about 3% by weight may advantageously be included in the glass since crystallization is promoted thereby but the principal crystal phase will still be a stuffed derivative of beta-cristobalite.

Since these critsobalite-containing bodies have a very low content of alkali metal oxides, they exhibit excellent electrical insulating properties. The bodies are uniformly fine-grained, the crystals in general ranging in size between about 0.1–10 microns.

Therefore, in its broadest terms, my invention contemplates the production of glass-ceramic products wherein one of the dimorphs of cristobalite constitutes the principal crystal type. In general, the manufacturing procedure consists of compounding a batch of the required alumina and silica components to which is added the proper amount of $Li_2O$ or CaO, CuO, and SrO. The batch ingredients are mixed together very thoroughly and then melted at a sufficiently high temperature that a homogeneous melt is obtained. The melt is then simultaneously cooled and formed into a glass article of the desired configuration. The glass article is thereafter subjected to a predetermined heat treating schedule to develop the desired crystallization.

Table I records examples falling within the purview of my invention wherein the batch ingredients were ball milled together prior to melting in order to obtain better glass homogenity and more efficient melting. The melting was carried out in open crucibles of 70%–30% Pt-Rh alloy at a temperature of about 1850° C. for four hours. Each melt was poured into a steel mold thereby producing a patty about ½″ thick. The patty was then annealed to room temperature to permit a visual examination of the glass quality and the possible presence of devitrification. Devitrification occurring spontaneously as the melt is being cooled to a glass precludes the production of a uniformly fine-grained glass-ceramic body upon subsequent heat treatment of the glass. The glass patties were heat treated in the manner as decorded in Table II.

Table I sets out glass-forming batches expressed in weight percent on the oxide basis, exclusive of minor impurities that may be present in the batch materials, which, when heat treated according to the description set out in Table II, yielded the cristobalite-containing glass-ceramic bodies of this invention.

It will be appreciated that the batch ingredients may consist of any material which, on being melted together, are transformed to the desired oxide compositions in the proper proportions.

The ranges of the components set out above are critical to obtain the desired products of the invention. Thus, where the $Al_2O_3$ is greater than about 40% by weight, mullite rather than cristobalite constitutes the principal crystal phase developed. At least 5% by weight of $Al_2O_3$ must be present to supply the necessary substitutionary combination with $Li_2O$ and/or CaO, CuO, or SrO. Further, at least 0.5% $Li_2O$ must be included in the composition to stabilize the alpha-cristobalite derivative crystallized upon heat treatment of the glass but more than about 3% $Li_2O$ lowers the refractoriness of the crystallized body and hazards the formation of crystal phases which are not fine-grained or compatible with cristobalite and any mullite which might be present in minor amounts. Finally, at least 1% CaO, CuO, or SrO must be present to insure the development of beta-cristobalite rather than the alpha dimorph but more than about 5% total results in the growth of an incompatible crystal phase and a loss of refractoriness or an increase in distortion.

The mechanism of crystallization of these glass-ceramic products is not fully understood. No nucleating agent as such is required. However, as is the case in the conventional manufacture of glass-ceramics, the heat treatment involves two steps, viz, nucleation and then crystal growth. Thus, the melted batch is cooled to a temperature at least below the transformation range of the glass to form a glass shape. The transformation range is defined as that temperature at which a liquid melt is deemed to have been converted to an amorphous solid. This temperature is generally around the annealing point of the glass (about 800°–850° C. for the glasses of this invention). After the melt is cooled to a glass shape, this shape is then heated to within the nucleation range (estimated to range from about 850°–950° C.) and maintained thereat for at least about ¼ hour, after which the shape is heated to a higher temperature (about 1000°–1400° C.) to expedite and maximize the crystallization. In general, the dwell period within the nucleation range varies from about ¼–4 hours, with 2 hours commonly resulting in very satisfactory nucleation. Much longer dwell times may be used and some crystal growth will occur at these temperatures where long holding periods are utilized. However, such practice is not commercially practical and crystallization at a higher temperature is much to be preferred. The maintenance time for crystallization within the crystallization range generally varies from about 1–8 hours with much longer periods, say 24 hours, being useful but not commercially practical. In other words, the glass shape must remain within the nucleation range for a sufficient length of time to develop satisfactory nucleation. Good nucleation then insures the production of a homogeneous, uniformly fine-grained body. The nucleated body is then held within the crystallization range for a sufficient length of time to produce the desired highly crystalline body. These times, as is the case in all time-temperature reactions or processes, are dependent upon the extent to which the components of the batch are adaptable to the formation of crystal phases and the temperatures at which the nucleations and crystallizations are carried out.

Although in the preferred practice of the invention, a literal two-step heat treatment is employed, very satisfactorily crystallized products can be developed where the glass shape is subjected to a gradual, but constant, increase in temperature from room temperature or from just below the transformation point. It can be appreciated that in the early stages of crystallization the proportion of crystals to glassy matrix is small and the shape will deform if heated too rapidly. I have found that the rate of temperature increase should not exceed about 5° C./minute to insure against thermal deformation. Naturally, where thermal deformation is of no concern or where physical supports are employed to maintain body dimension, much faster heating rates can be utilized. This modification in method makes for a simple continuous kiln-type operation since no dwell period would be re-

TABLE I

|  | 1 | 2 | 3 | 4 | 5 | 6 | 7 | 8 |
|---|---|---|---|---|---|---|---|---|
| $SiO_2$ | 74 | 71.5 | 70.5 | 70.0 | 66.0 | 64.0 | 62.0 | 58.0 |
| $Al_2O_3$ | 24 | 27.0 | 28.0 | 27.0 | 31.0 | 31.0 | 35.0 | 39.0 |
| $Li_2O$ | 2 | 1.5 | 1.5 | 1.0 | 1.0 | 1.0 | 1.0 | 1.0 |
| CaO |  |  |  | 2.0 | 2.0 | 4.0 | 2.0 | 2.0 |

|  | 9 | 10 | 11 | 12 | 13 | 14 | 15 | 16 |
|---|---|---|---|---|---|---|---|---|
| $SiO_2$ | 62.0 | 76.0 | 75.0 | 79.0 | 73.0 | 72.64 | 71.0 | 71.83 |
| $Al_2O_3$ | 36.0 | 23.0 | 22.0 | 19.0 | 25.0 | 24.65 | 24.1 | 24.37 |
| $Li_2O$ | 1.0 |  |  |  |  |  |  |  |
| CaO | 1.0 |  | 3.0 | 2.0 | 2.0 | 2.71 |  |  |
| CuO |  | 2.0 |  |  |  |  |  | 3.8 |
| SrO |  |  |  |  |  |  | 4.9 |  |

|  | 17 | 18 | 19 | 20 | 21 | 22 | 23 | 24 |
|---|---|---|---|---|---|---|---|---|
| $SiO_2$ | 86.0 | 81.0 | 77.0 | 88.5 | 72.0 | 74.0 | 69.0 | 71.0 |
| $Al_2O_3$ | 12.0 | 16.5 | 23.0 | 9 | 23.5 | 20.5 | 26.5 | 25.0 |
| $Li_2O$ | 2.0 | 2.5 | 1.0 | 2.5 | 0.5 | 1.0 |  | 1.0 |
| CaO |  |  |  |  | 2.0 | 1.0 |  |  |
| CuO |  |  |  |  | 2.0 | 2.0 | 3.5 |  |
| SrO |  |  |  |  | 1.5 | 1.0 |  | 3.0 | quired at a specific temperature within the nucleation range.

Table II comprises a tabulation of the heat treating schedules employed utilizing an electric furnace, visual descriptions of the final products, the crystal phases present as identified by X-ray diffraction methods, and some thermal expansion measurements at 0°–300° C. and density measurements conducted according to conventional testing procedures. The crystallized articles were conveniently cooled to room temperature by merely cutting off the heat to the furnace and allowing the furnace to cool with the articles retained therein. This cooling averaged about 3° C./minute. Much more rapid cooling rates can be used, if desired, particularly where small articles are being produced. The mullite reported constituted only a minor proportion of the total crystallization.

stitute less than 5% by weight. Such compatible oxides include ZnO, PbO, BeO, MnO, CdO, $P_2O_5$, and MgO. Likewise, strong fluxes like $B_2O_3$ and fluorine should not be present in amounts more than about 3% since the refractoriness of the final product is deleteriously affected. Finally, the alkali metal oxides $Na_2O$, $K_2O$, $Rb_2O$, and $Cs_2O$ are preferably absent from the composition since these tend to inhibit the growth of the cristobalite derivatives.

The crystals comprise greater than 50% by weight of the body and generally over 60% by weight thereof. Substantially all of the crystals range in size between 0.1–30 microns.

I claim:

1. A glass-ceramic body containing an analogue of alpha-cristobalite as the principal crystal form, said crys-

TABLE II

| Example No. | Heat treatment | Description | Crystal phases | Exp. coeff. ($\times 10^{-7}$/ C.) | Density (g./cc.) |
|---|---|---|---|---|---|
| 1 | 5° C./min. to 850° C., hold 850° C. for 2 hrs.; 1° C./min. to 960° C., hold 960° C. for 6 hrs. | Fine-grained transparent | Alpha-cristobalite, mullite | | |
| 2 | 5° C./min. to 850° C., hold 850° C. for 2 hrs.; 5° C./min. to 1,005° C., hold 1,005° C. for 6 hrs. | do | Alpha-cristobalite | 177.8 | 2.573 |
| 3 | 5° C./min. to 850° C., hold 850° C. for 2 hrs.; 1° C./min. to 1,030° C., hold 1,030° C. for 6 hrs. | do | do | 168.3 | 2.528 |
| 4 | 5° C./min. to 850° C., hold 850° C. for 2 hrs.; 5° C./min. to 1,000° C., hold 1,000° C. for 6 hrs. | Fine-grained, translucent, gray | Beta-cristobalite, mullite | 82.4 | 2.481 |
| 5 | do | Fine-grained, opaque, gray-white. | do | 77.2 | 2.525 |
| 6 | do | Fine-grained, translucent, white | do | 67.2 | |
| 7 | 5° C./min. to 850° C., hold at 850° C. for 2 hrs.; 5° C./min. to 1,200° C., hold at 1,200° C. for 6 hrs. | Fine-grained, translucent, gray-white. | do | 73.1 | 2.607 |
| 8 | do | Fine-grained, translucent, light gray. | do | 67.0 | 2.649 |
| 9 | do | Fine-grained, translucent, white haze. | do | 81.9 | 2.610 |
| 10 | 5° C./min. to 850° C., no hold at 850° C.; 1° C./min. to 1,100° C., hold at 1,100° C. for 10 hrs. | Fine-grained, translucent, green-white. | do | | 2.498 |
| 11 | 1° C./min. to 1,300° C., hold at 1,300° C. for 4 hrs. | Fine-grained, opaque, white | do | | 2.469 |
| 12 | 5° C./min. to 900° C., hold at 900° C. for 2 hrs.; 5° C./min. to 1,400° C., hold at 1,400° C. for 4 hrs. | do | do | | |
| 13 | 1° C./min. to 1,300° C., hold at 1,300° C. for 4 hrs. | do | do | | 2.508 |
| 14 | 1° C./min. to 1,100° C., hold at 1,100° C. for 10 hrs. | Fine-grained, translucent, white | do | | 2.491 |
| 15 | do | Fine-grained, opaque, white | do | 71.1 | 2.525 |
| 16 | 1° C./min. to 1,100° C., hold at 1,100° C. for 11 hrs. | Fine-grained, translucent, green-white. | | | |
| 17 | 5° C./min. to 900° C., hold at 900° C. for 1 hr.; 5° C./min. to 1,000° C., hold at 1,000° C. for 8 hrs. | Fine-grained, transparent | Alpha-cristobalite | | |
| 18 | 1° C./min. to 1,000° C., hold at 1,000° C. for 8 hrs. | do | do | | |
| 19 | 1° C./min. to 1,200° C., hold at 1,200° C. for 4 hrs. | do | do | | |
| 20 | 5° C./min. to 850° C., hold at 850° C. for ½ hr.; 5° C./min. to 1,200° C., hold at 1,200° C. for 2 hrs. | do | do | | |
| 21 | 5° C./min. to 900° C., hold at 900° C. for ¼ hr.; 1° C./min. to 1,100° C., hold at 1,100° C. for 6 hrs. | Fine-grained, translucent, white. | Beta-cristobalite, mullite | | |
| 22 | 5° C./min. to 850° C., hold at 850° C. for 1 hr.; 1° C./min. to 1,300° C., hold at 1,300° C. for 3 hrs. | Fine-grained, opaque, white | do | | |
| 23 | 5° C./min. to 950° C., hold at 950° C. for ½ hr.; 1° C./min. to 1,100° C., hold at 1,100° C. for 2 hrs. | Fine-grained, translucent, white | do | | |
| 24 | 5° C./min. to 900° C., hold at 900° C. for 1 hr.; 5° C./min. to 1,000° C., hold at 1,000° C. for 6 hrs. | do | do | | |

Table II illustrates the effectiveness of $Li_2O$ in causing the growth of alpha-cristobalite-type crystals as the principal phase in glasses of the present invention and clearly demonstrates the effect of CaO, CuO, or SrO additions to the $Li_2O$-containing glasses to promote the crystallization of the beta-cristobalite structure rather than of the alpha dimorph. While, as has been explained above, the amounts of $Al_2O_3$, $SiO_2$, and $Li_2O$ and/or CaO, CuO, or SrO are critical to the invention, minor amounts of compatible metal oxides may be included in the glass compositions which do not deleteriously affect the nucleation and growth of the desired crystalline forms of cristobalite. These additions should not total more than 9% by weight of the glass, and, preferably, contals being formed by crystallization in situ from a glass body consisting essentially, by weight on the oxide basis, of 5–40% $Al_2O_3$, 55–90% $SiO_2$, and the balance 0.5–3% $Li_2O$.

2. A glass-ceramic body in accordance with claim 1 wherein said crystals comprise at least 50% by weight of the body.

3. A glass-ceramic body in accordance with claim 1 wherein said crystals range in size between 0.1–30 microns.

4. A glass-ceramic body containing an analogue of beta-cristobalite as the principal crystal form, said crystals being formed by crystallization in situ from a glass body consisting essentially, by weight on the oxide basis, of 5–40% $Al_2O_3$, 55–90% $SiO_2$, and the balance 1–5% total of at least one member selected from the group consisting of CaO, CuO, and SrO.

5. A glass-ceramic body in accordance with claim 4 wherein said crystals comprise at least 50% by weight of the body.

6. A glass-ceramic body in accordance with claim 4 wherein said crystals range in size between 0.1–30 microns.

7. A method for making a glass-ceramic body containing a derivative of alpha-cristobalite as the principal crystal form comprising the steps of:
 (a) melting a glass-forming composition consisting essentially, by weight on the oxide basis, of 5–40% $Al_2O_3$, 55–90% $SiO_2$, and the balance 0.5–3% $Li_2O$;
 (b) simultaneously cooling the melt below the transformation range of said melt and forming a glass shape therefrom;
 (c) heating said glass shape to about 850°–950° C. for at least about ¼ hour to attain the desired nucleation;
 (d) raising the temperature of said glass shape to about 1000°–1400° C. for a period of time sufficient to attain the desired crystallization; and
 (e) cooling said glass shape to room temperature.

8. A method according to claim 7 wherein the time necessary to attain the desired nucleation varies from about ¼–4 hours.

9. A method according to claim 7 wherein the time necessary to attain the desired crystallization varies from about 1–8 hours.

10. A method for making a glass-ceramic body containing a derivative of beta-cristobalite as the principal crystal form comprising the steps of:
 (a) melting a glass-forming composition consisting essentially, by weight on the oxide basis, of 5–40% $Al_2O_3$, 55–90% $SiO_2$, and the balance 1–5% total of at least one member of the group consisting of CaO, CuO, and SrO;
 (b) simultaneously cooling the melt below the transformation range of said melt and forming a glass shape therefrom;
 (c) heating said glass shape to about 850°–950° C. for at least about ¼ hour to attain the desired nucleation;
 (d) raising the temperature of said glass shape to about 1000°–1400° C. for a period of time sufficient to attain the desired crystallization; and
 (e) cooling said glass shape to room temperature.

11. A method according to claim 10 wherein the time necessary to attain the desired nucleation varies from about ¼–4 hours.

12. A method according to claim 10 wherein the time necessary to attain the desired crystallization varies from about 1–8 hours.

References Cited

UNITED STATES PATENTS

| | | | |
|---|---|---|---|
| 3,236,662 | 2/1966 | MacDowell | 106—52 XR |
| 3,241,985 | 3/1966 | Kuwayama | 106—39 |
| 3,252,811 | 5/1966 | Beall | 106—39 |
| 3,282,711 | 11/1966 | Lin | 106—39 |
| 3,006,775 | 10/1961 | Chen | 106—39 |

OTHER REFERENCES

Searle: Refractory Materials, Zneb Chas. Griffin, London (1950), pp. 184–185.

HELEN M. McCARTHY, *Primary Examiner.*

U.S. Cl. X.R.

65—33; 106—52